(12) United States Patent
Kino et al.

(10) Patent No.: US 6,880,522 B2
(45) Date of Patent: Apr. 19, 2005

(54) MOTOR DRIVEN THROTTLE CONTROL DEVICE AND METHOD OF MOUNTING MOTOR THERETO

(75) Inventors: Hisashi Kino, Aichi-ken (JP); Shinji Kawai, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/680,425

(22) Filed: Oct. 8, 2003

(65) Prior Publication Data

US 2004/0103879 A1 Jun. 3, 2004

(30) Foreign Application Priority Data

Oct. 9, 2002 (JP) ........................ 2002-296631

(51) Int. Cl.$^7$ ............................ F02D 9/08; F16K 31/02
(52) U.S. Cl. .................. 123/337; 123/399; 251/129.11; 318/254
(58) Field of Search ................................ 123/399, 337; 251/129.11; 318/254

(56) References Cited

U.S. PATENT DOCUMENTS 5,979,405 A * 11/1999 Sato et al. .................. 123/399

FOREIGN PATENT DOCUMENTS

| EP | 1 217192 | 6/2002 |
|---|---|---|
| JP | 11 187604 | 7/1999 |
| JP | 2001 132495 | 5/2001 |

* cited by examiner

*Primary Examiner*—Carl S. Miller
*Assistant Examiner*—Arnold Castro
(74) *Attorney, Agent, or Firm*—Dennison, Schultz, Dougherty & MacDonald

(57) ABSTRACT

Provided is a throttle control device having a throttle body (1) forming an intake passage (1a) inside the throttle body. A throttle valve (2) is rotatably arranged in the intake passage. A motor (4) rotates the throttle valve. The motor has a motor casing (28), which has one axial end portion and the other axial end portion. A first support device (5, 29) fixedly supports one axial end portion of the motor casing with respect to the throttle body. A second support device (6, 24) supports the other axial end portion of the motor casing with respect to the throttle body resiliently in the radial direction of the motor. The second support device includes a substantially ring-shaped resilient support member (6).

16 Claims, 4 Drawing Sheets

MOTOR DRIVEN THROTTLE CONTROL DEVICE AND METHOD OF MOUNTING MOTOR THERETO

This application claims priority to Japanese application serial Number 2002-296631, which application is hereby incorporated by reference herein in its entirety.

BACKGROUND OF THE INVENTION

1. Field of the Invention

The present invention relates to a throttle control device equipped with a throttle valve for controlling a flow rate of a fluid, and more specifically to a motor drive throttle control device for controlling the flow rate of air, for example, intake air to be supplied to an automotive engine. The present invention also relates to a method of mounting a motor to a throttle body of a throttle control device.

2. Description of the Related Art

Japanese Laid-Open Patent Publication No. 2001-132495 discloses a conventional throttle control device. In the throttle control device disclosed in this gazette, a throttle valve arranged in an intake passage formed in a throttle body is rotated by a motor. As the throttle valve rotates, the intake passage is incrementally opened and closed to thereby control the intake air amount. One end portion of the motor casing of the motor is fixed to the throttle body in a cantilever-like fashion, whereas the other end portion of the motor casing is spaced apart from the throttle body, i.e., in a so-called free state, with a predetermined gap being provided therebetween (Refer to pages 3 and 4 and FIG. 1 of the publication).

Japanese Laid Open Patent Publication No. 11-187604 discloses a throttle control device in which one end portion of the motor casing of the motor is fixed to the throttle body in a cantilever-like fashion, and the other end portion of the motor casing is supported by the throttle body via a resilient motor support member (Refer to pages 4 and 5 and FIG. 2 of the publication).

In the device as disclosed in Japanese Laid-Open Patent Publication No. 2001-132495, in which the other end portion of the motor casing is in a free state, this other end portion may vibrate in the radial direction of the motor casing due to various reasons, such as engine vibrations, road irregularities, etc. Thus, the device is limited in terms of the vibration resistance of the motor.

While the device as disclosed in Japanese Laid-Open Patent Publication No. 11-187604 has an improved vibration resistance of the motor as compared to Publication No. 2001-132495, it utilizes a rather complicated configuration in which the motor support member is fitted in its entirety into the other end portion of the motor casing. This complicated configuration results in a relatively high cost.

SUMMARY OF THE INVENTION

It is accordingly an object of the present invention to provide techniques that present improvements in terms of motor vibration resistance and overall reduction in manufacturing costs of a throttle control device.

According to a first aspect of the current invention, the throttle control device has a throttle body defining an intake passage inside of the throttle body. A throttle valve is rotatably arranged within the intake passage. A motor rotates the throttle valve. The motor has a motor casing. The motor casing has one axial end portion and an other axial end portion. A first support device fixedly supports one axial end portion of the motor casing with respect to the throttle body. A second support device supports the other axial end portion of the motor casing with respect to the throttle body, resiliently in the radial direction of the motor. The second support device has a substantially ring-shaped resilient support member.

As a result, the motor is fixedly supported on one side, and is resiliently supported on the other side with respect to the motor's axial direction. The radial vibration in the other end portion of the motor casing of the motor can be reduced or minimized by this arrangement, thereby achieving an improvement in terms of vibration resistance of the motor. Further, the second support device resiliently supporting the other end portion of the motor casing of the motor may utilize a simple ring-shaped support member, causing an additional reduction in cost.

It is preferable for the support member to be an O-ring. In particular, by adopting a commercially available O-ring, it is possible to achieve further cost reductions.

It is also advantageous for the second support device to be constructed so as to resiliently support the other axial end portion of the motor casing on the throttle body with respect to the axial direction of the motor casing. This construction helps to achieve even further improvement in terms of vibration resistance.

Additionally, preferably, the throttle body has a motor housing in which a motor is disposed. Formed in the motor housing is a substantially circular indentation that receives, with clearance, a shaft portion provided at the other axial end portion of the motor casing. The support member is interposed between the shaft portion and an inner peripheral surface of the substantially circular indentation.

Further, it is advantageous if the shaft portion protrudes from the other axial end surface of the motor casing, and the outer diameter of the shaft portion is smaller than the outer diameter of the motor casing. This construction makes the second support device compact.

Further, it is preferable for the support member to be disposed between the other axial end surface of the motor casing and a support surface provided within the circular indentation so as to be axially opposed to the end surface of the motor casing. This arrangement makes it possible to support the other axial end portion of the motor casing on the motor housing resiliently with respect to the axial direction of the motor.

According to a second aspect of the present invention, there is provided a method of mounting a motor to a throttle body in the throttle control device described above. This method includes the following steps: a) attaching the support member to the other end portion of the motor casing of the motor; b) inserting the motor into the throttle body, starting with the other end portion with the support member attached thereto, whereby the other axial end portion of the motor casing is supported by the throttle body resiliently with respect to the radial direction of the motor via the second support device; and c) fixing the end portion of the motor casing to the throttle body via the first support device.

In this method, it is possible to affect the resilient support by the second support device through a relatively simple operation of inserting the motor into the throttle body, with the support member previously attached to the motor casing, so that the motor casing installation operation is facilitated.

Further, it is advantageous for step b) to include supporting the other axial end portion of the motor casing resiliently on the throttle body also with respect to the axial direction of the motor casing via the second support device.

BRIEF DESCRIPTION OF THE DRAWINGS

Additional objects, features and advantages of the present invention will be readily understood after reading the following detailed description together with the claims and the accompanying drawings, in which:

DESCRIPTION OF THE PREFERRED EMBODIMENT

A throttle control device according to an embodiment of the present invention will be described with reference to the drawings. First, the throttle control device will be described in general. The throttle control device of this embodiment is formed as an electronic-control type throttle control device for controlling the throttle valve opening in response to signals from an engine control unit (ECU) of an automobile (not shown), including, but not limited to signals such as an acceleration signal related to an accelerator pedal depression amount, a traction control signal, a constant-speed traveling signal such as from a cruise control device, and an idling speed control signal.

Figure 1:
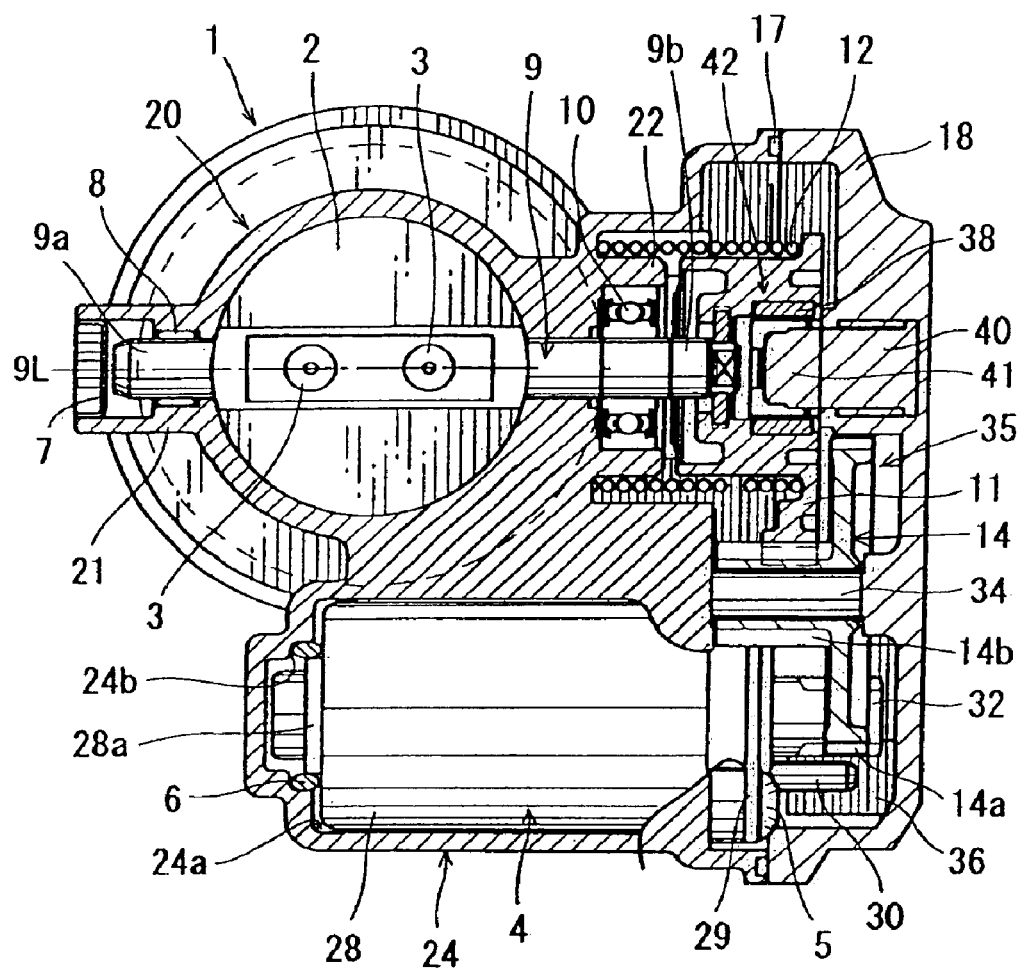
FIG. 1 is a cross-sectional view of a throttle control device according to an embodiment of the present invention.
Figure 2:
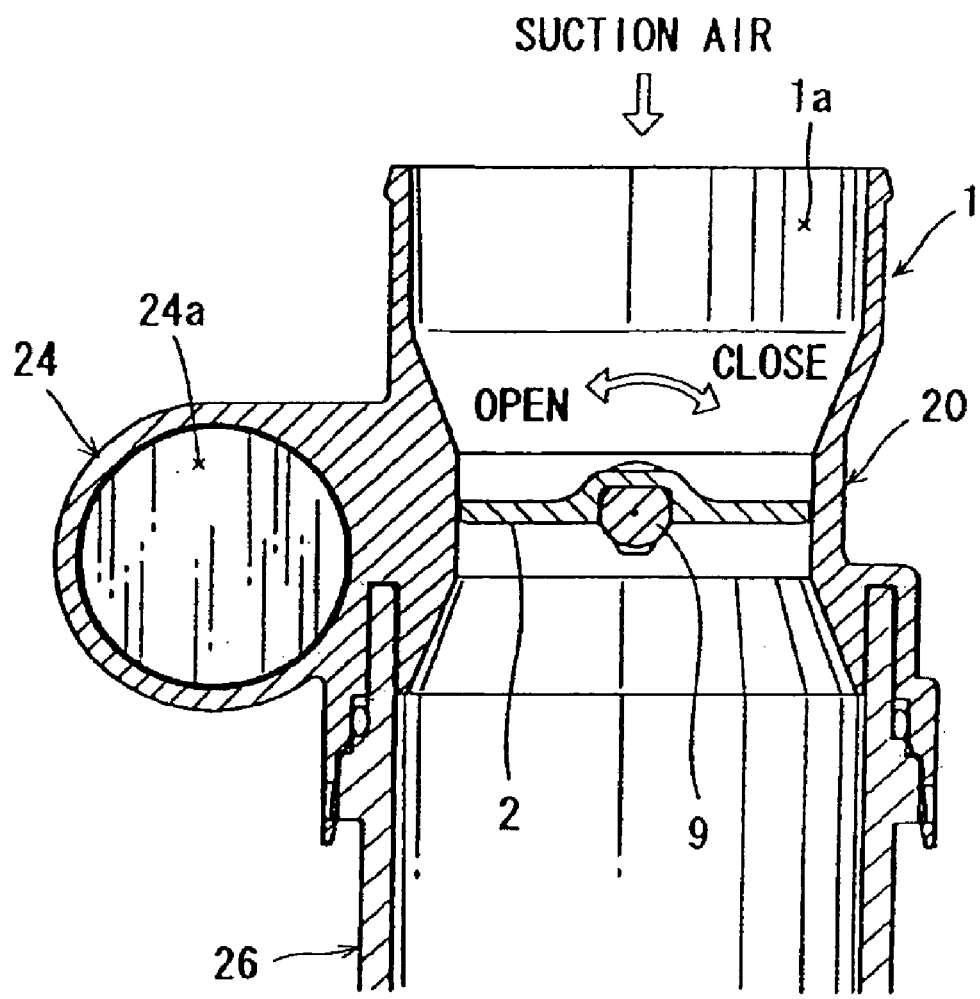
FIG. 2 is a vertical sectional view of the throttle control device of FIG. 1.

Referring to FIGS. 1 and 2, the throttle control device of this embodiment is equipped with a throttle body 1. The throttle body 1 is equipped with a main body portion 20 and a motor housing portion 24, which may be formed as an integral unit using resin. As shown in FIG. 2, formed in the main body portion 20 is a substantially cylindrical intake passage 1a extending vertically as viewed in the FIG. 2. Further, in FIG. 2, an air cleaner (not shown) is connected to an upper portion of the main body portion 20, and an intake manifold 26 is connected to a lower portion thereof.

In the main body portion 20, there is mounted a metal throttle shaft 9 radially extending across the intake passage 1a (See FIG. 1). As shown in FIG. 1, bearing portions 21 and 22 through the intermediation of bearings 8 and 10 rotatably supports end portions 9a and 9b, respectively, of the throttle shaft 9. A throttle valve 2, made of resin for example, is fixed to the throttle shaft 9, possibly by means of a plurality of rivets 3 as shown. The throttle valve 2, which is situated inside the intake passage 1a, rotates so as to close the intake passage 1a as the throttle shaft 9 rotates in one direction, and rotates so as to open the intake passage 1a as the throttle shaft 9 rotates in the other direction. These incremental opening and closing movements of the throttle valve 2 controls the amount of intake air flowing through the intake passage 1a. In FIG. 2, the throttle valve 2 is in a fully closed position. When the throttle valve in the fully closed position is rotated counterclockwise, as viewed in FIG. 2, the intake passage 1a is opened.

A plug 7 for confining the end portion 9a within the main body portion 20 is fitted into the bearing portion 21. Bearing portion 21 supports one end portion 9a (the left-hand end as seen in FIG. 1) of the throttle shaft 9. The other end portion 9b (the right-hand end as seen in FIG. 1) of the throttle shaft 9 extends through the bearing portion 22 and protrudes further to the right. A throttle gear 11 consisting of a sector gear is fixed to the protruding end of this end portion 9b so as not to allow relative rotation. A spring force, such as a torsion coil spring 12, is provided between the outer peripheral portion of the bearing portion 22 of the throttle body 1 and the outer peripheral portion of the throttle gear 11. This torsion coil spring 12 always urges the throttle valve 2 so as to close it through the throttle gear 11 and the throttle shaft 9. Further, although not shown, provided between the throttle body 1 and the throttle gear 11 is a stopper for preventing the throttle valve 2 from rotating in the closing direction beyond the fully closed position.

As shown in FIG. 1, the motor housing portion 24 of the throttle body 1 is formed in a cylindrical configuration having an axis substantially parallel with an axis 9L of the throttle shaft 9. One axial end (the left-hand end as seen in the drawing) of the motor housing 24 is closed. The interior of the motor housing portion 24 defines a space 24a open on the right-hand side of the throttle body 1. The space 24a accommodates a motor 4 that may be, for example, a DC motor. In the accommodation state as shown, the axis of the motor 4 extends parallel to the axis 9L of the throttle shaft 9. An output shaft 4a (See FIG. 3) of the motor 4 is positioned to the right, as seen in FIG. 1. The motor 4 has a motor casing 28 that defines an outer surface of the motor 4. Provided on the right-hand side of the motor casing 28 is a mounting flange 29, which is fastened to the motor housing portion 24, preferably by means of a plurality of screws 5 (See FIG. 3).

As shown in FIG. 1, the motor casing 28 of the motor 4 has a motor end portion 28a protruding in the axial direction of the motor casing 28 from the insertion side end of the motor casing 28 (the left-hand side end in FIG. 1). The motor end portion 28a is formed as a shaft having a diameter smaller than that of the motor casing 28. Further, a bearing case 28b protrudes to the left as seen in the drawing from this motor end portion 28a. Prior to the insertion of the motor 4 into the motor housing portion 24 of the throttle body 1, an resilient support member 6 is mounted to the motor end portion 28a of the motor 4. Further, formed in the motor housing portion 24 is a stepped substantially circular depression 24b of a small diameter capable of receiving, with a predetermined clearance, the motor end portion 28a of the motor casing 28 together with the bearing case 28b (See FIG. 4).

As the support member 6, there is adopted a commercially available O-ring having a substantially round sectional configuration. The support member 6 has an inner diameter that is somewhat smaller than the outer diameter of the motor end portion 28a of the motor 4. Further, the support member 6 has an outer diameter that is somewhat larger than the inner diameter of a corresponding circular inset portion 24b1 (See FIG. 4) of the stepped circular depression 24b of the motor housing portion 24 of the throttle body 1. Thus, utilizing its radial resilient deformation, the resilient support member 6 is closely fitted onto the outer peripheral surface of the motor end portion 28a of the motor casing 28 of the motor 4. Thereafter, the motor 4 is inserted into the motor housing portion 24 of the throttle body 1, and the motor end portion 28a of the motor casing 28 is inserted into the stepped circular depression 24b of the motor housing portion 24 together with the bearing case 28b. At this time, the support member 6 undergoes radial resilient deformation, and is closely fitted onto the inner peripheral surface of the circular inset portion 24b1 of the stepped circular depression 24b. As a result, the motor end portion 28a is supported by the motor housing portion 24 via the support member 6 resiliently with respect to the radial direction (See FIGS. 1 and 4). Further, the support member 6 is resiliently deformed (compressed) in the axial direction (left and right directions as seen in FIGS. 1 and 4) between the end surface of the motor casing 28 and a step portion 24b2 extending radially inwards from the circular inset portion 24b1 (See FIG. 4). In this state, as described above, the mounting flange portion 29 of the motor casing 28 of the motor 4 is fastened to the motor housing portion 24, for example, by means of a pair of screws 5 for fixation (See FIGS. 3 and 4).

Even though the depression of 24b (as well as 24b1) is described as substantially circular, the current invention is not limited to this one geometric description. Practioners skilled in the art will recognize that a variety of shapes can be used to provide similar results. It is preferable to use substantially circular depressions and insets in the current invention in order to take full advantage of ring shaped support structure.

Figure 3:
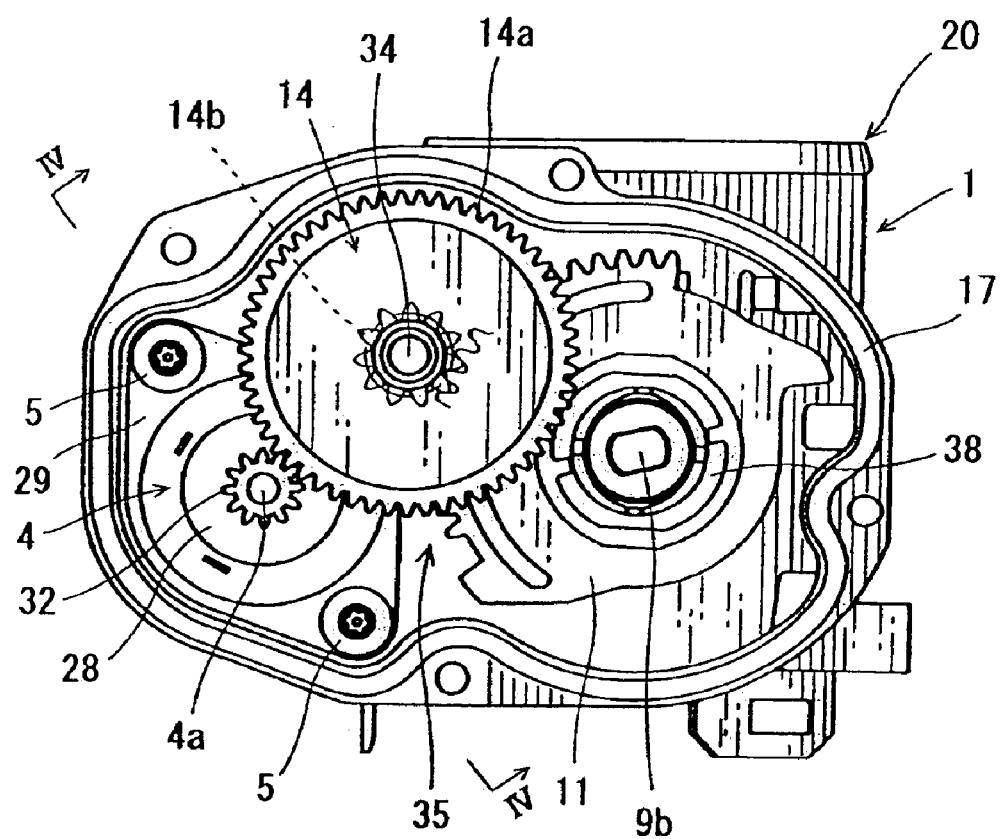
FIG. 3 is a side view of the throttle control device, with its cover removed.
Figure 4:
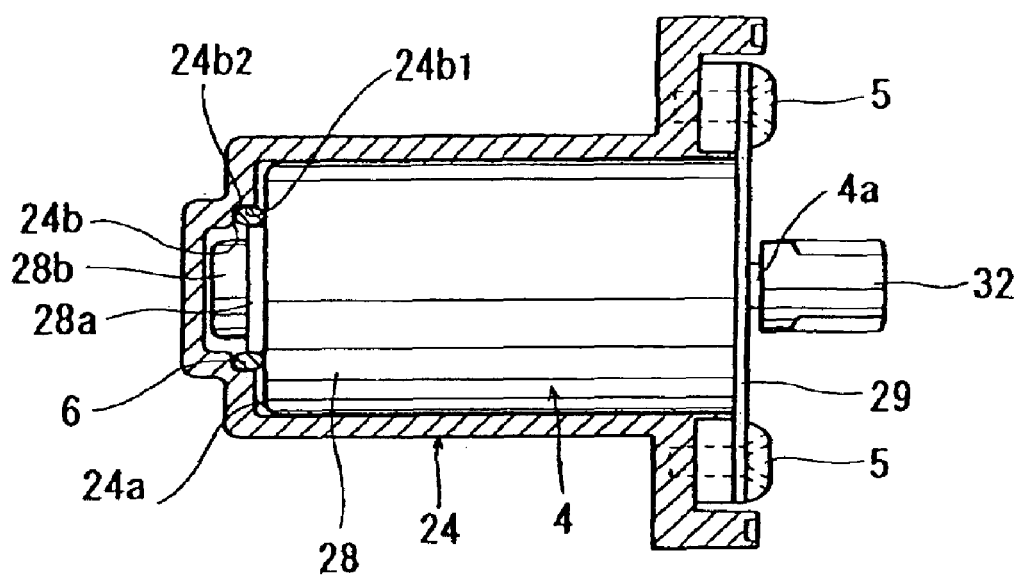
FIG. 4 is a sectional view of the throttle control device taken along a line IV—IV of FIG. 3.

The output shaft 4a of the motor 4 protrudes to the right as seen in FIG. 1 beyond the mounting flange 29, and a motor pinion 32 is fastened to this protruding portion (See FIG. 3). Further, as shown in FIG. 1, a counter shaft 34 is mounted to the throttle body 1 at a position between the main body portion 20 and the motor housing portion 24. The counter shaft 34 extends parallel to the axis 9L of the throttle shaft 9. A counter gear 14 is rotatably mounted to the counter shaft 34. The counter gear 14 has two gear portions 14a and 14b having different gear diameters. The large diameter gear portion 14a is in mesh with the motor pinion 32, and the small diameter gear portion 14b is in mesh with the throttle gear 11 (See FIG. 1). The motor pinion 32, the counter gear 14, and the throttle gear 11 constitute a speed reduction gear mechanism 35.

As shown in FIG. 1, a cover 18 mainly covering the speed reduction gear mechanism 35 is connected to the right-hand side surface of the throttle body 1 by a coupling means (not shown), for example, a coupling means may include a snap-fitting means, screw means, or clamp means, among others. Between the right-hand side surface of the throttle body 1 and the cover 18, there is provided an O-ring 17 to maintain these components in a sealed state. Further, the motor 4 has a motor terminal 30 protruding from the mounting flange 29, and this motor terminal 30 is electrically connected to a battery (not shown) and, further, to the ECU by way of a relay terminal (not shown) of a relay connector 36 provided in the cover 18. Thus, the motor 4 is driven in accordance with an acceleration signal related to accelerator pedal depression amount, a traction control signal, a constant-speed traveling signal, and an idling speed control signal, etc. The driving force of the motor 4 is transmitted to the throttle shaft 9 through the speed reduction gear mechanism 35, that is, through the motor pinion 32, the counter gear 14, and the throttle gear 11.

A ring-shaped magnet 38 is provided on the right-hand side surface of the throttle gear 11. This magnet 38 has a pair of semi-arcuate magnet segments exhibiting different polarities. Inside the cover 18, there is mounted a circuit board 40 opposed to the end surface of the throttle shaft 9. Mounted on the circuit board 40 is a Hall effect element 41 situated inside the magnet 38. When the throttle gear 11 rotates with the throttle shaft 9, the Hall element 41 detects a change in the magnetic field due to the magnet 38, and generates a Hall voltage. The Hall voltage generated by the Hall element 41 is input to the ECU by way of the circuit board 40 and the connector (not shown) provided in the cover 18. The ECU determines the throttle opening according to the change in the magnetic field of the magnet 38 as a magnetic physical quantity, and performs various control operations, such as fuel injection control, correction control on the opening of the throttle valve 2, and gear change control for automatic transmission, according to the vehicle speed detected by a vehicle speed sensor (not shown), etc. The magnet 38, the circuit board 40, and the Hall element 41 constitute a throttle sensor 42.

In the above-described throttle control device, when the engine is started, drive control is performed on the motor 4 based on a signal from the ECU, whereby, as described above, the throttle valve 2 is opened or closed through the speed reduction gear mechanism 35, with the result that the amount of intake air flowing through the intake passage 1a of the throttle body 1 is controlled.

Further, in the above-described throttle control device, one end portion of the motor casing 28 of the motor 4 is fixed to the throttle body 1 in a cantilever-like fashion. On the other hand, the other end portion (motor end portion 28a) of the motor casing 28 of the motor 4 is resiliently supported by the throttle body 1 with respect to the radial via ring-shaped resilient support member 6 (See FIG. 4). Thus, the motor 4 is supported at both ends through fixation and resilient support. As a result, the radial vibration of the other end portion of the motor casing 28 of the motor 4 is relatively reduced or minimized compared to unsupported motors, thereby improving the vibration resistance of the motor 4. Further, the support member 6 (See FIG. 4) resiliently supporting the other end portion of the motor casing 28 of the motor 4 is formed in a simple, ring-like configuration, thereby achieving a reduction in cost as compared to other forms of support.

Further, by adopting a commercially available O-ring as the support member 6, it is possible to achieve an additional reduction in cost.

Further, due to the resilient deformation of the support member 6, it is possible to have lower tolerance build specifications between the motor 4 and the motor housing 24 of the throttle body 1.

Further, the reduction of radial vibration in the other end portion of the motor casing 28 of the motor 4 by the support member 6 is advantageous from the viewpoint of lowering the tendency of the screws 5 to loosen over time.

The present invention is not restricted to the above-described embodiment but covers various modifications and variations of this embodiment. For example, while in the above-described embodiment the throttle body 1 and the throttle valve 2 are made of resin, it is also possible for them to be formed of some other material, such as metal. Further, the construction of the throttle sensor 42 and/or the speed reduction gear mechanism 35 is not restricted to the one described above. It is possible to adopt various other constructions therefor.

Further, as the means for fixing one end portion of the motor casing 28 of the motor 4 to the throttle body 1 in a cantilever-like fashion, it is also possible to use many different fastening means other than the screws 5, some examples are bolts, nuts, or rivets. Further, there are no particular restrictions regarding the specification of support member 6 as long as it is a resilient, ring-shaped member. The sectional configuration of the support member 6 is not limited to the elliptical one shown; some of the many additional sectional shapes include round and rectangular ones. Further, instead of a ring that is circumferentially continuous, it is also possible, for example, to utilize a plurality of ring segments arranged circumferentially at intervals.

What is claimed is:

1. A Throttle control device comprising:
   a throttle body defining an intake passage;

a throttle valve rotatably arranged in the intake passage;

a motor for rotating the throttle valve, the motor having a motor casing, with one axial end portion and an other axial end portion;

a first support device supporting the one axial end portion of the motor casing fixedly on the throttle body; and A second support device supporting the other axial end portion of the motor casing on the throttle body resiliently with respect to both of a radial direction and an axial direction of the motor casing, while the second support device being resiliently compressed with respect to both of the radial direction and the axial direction between the other axial end portion of the motor casing and the throttle body, wherein the second support device has a substantially ring-like resilient support member.

2. A throttle control device according to claim 1, wherein the support member comprises an O-ring.

3. A throttle control device according to claim 1, wherein the throttle body has a motor housing accommodating the motor, the motor housing having a stepped circular depression formed therein for receiving with clearance a shaft portion provided on the other axial end portion of the motor casing, and wherein the support member is disposed between the shaft portion and an inner peripheral surface of the stepped circular depression.

4. A throttle control device according to claim 2, wherein the throttle body has a motor housing accommodating the motor, the motor housing having a stepped circular depression formed therein for receiving with clearance a shaft portion provided on the other axial end portion of the motor casing, and wherein the support member is disposed between the shaft portion and an inner peripheral surface of the stepped circular depression.

5. A throttle control device according to claim 3, wherein the shaft portion protrudes from the other axial end surface of the motor casing, and wherein an outer diameter of the shaft portion is smaller than an outer diameter of the motor casing.

6. A throttle control device according to claim 4, wherein the shaft portion protrudes from the other axial end surface of the motor casing, and wherein an outer diameter of the shaft portion is smaller than an outer diameter of the motor casing.

7. A throttle control device according to claim 5, wherein the support member also is positioned between the other axial end surface of the motor casing and a support surface, and the support surface being defined within the stepped circular depression so as to be axially opposed to the end surface, so that the support member supports the other axial end portion of the motor casing on the motor housing resiliently also with respect to an axial direction of the motor.

8. A throttle control device according to claim 6, wherein the support member also is positioned between the other axial end surface of the motor casing and a support surface, and the support surface being defined within the stepped circular depression so as to be axially opposed to the end surface, so that the support member supports the other axial end portion of the motor casing on the motor housing resiliently also with respect to an axial direction of the motor.

9. A method of mounting a motor to a throttle body in the throttle control device as claimed in claim 1, the method comprising the steps of:

a) attaching the support member to the other end portion of the motor casing of the motor;

b) inserting the motor into the throttle body, starting with the other end portion with the support member attached thereto, to support the other axial end portion of the motor casing on the throttle body via the second support device resiliently with respect to both of the radial direction and the axial direction of the motor, while the second support device being resiliently compressed with respect to both of the radial direction and the axial direction between the other end portion of the motor casing and the throttle body; and c) fixing the other end portion of the motor casing to the throttle body via the first support device.

10. A method of mounting a motor to a throttle body in the throttle control device as in claim 2, the method comprising the steps of:

a) attaching the support member to the other end portion of the motor casing of the motor;

b) inserting the motor into the throttle body, starting with the other end portion with the support member attached thereto, to support the other axial end portion of the motor casing on the throttle body via the second support device resiliently with respect to the radial direction of the motor; and c) fixing the other end portion of the motor casing to the throttle body via the first support device.

11. A method of mounting a motor to a throttle body in the throttle control device as in claim 3, the method comprising the steps of:

a) attaching the support member to the other end portion of the motor casing of the motor;

b) inserting the motor into the throttle body, starting with the other end portion with the support member attached thereto, to support the other axial end portion of the motor casing on the throttle body via the second support device resiliently with respect to a radial direction of the motor; and c) fixing the other end portion of the motor casing to the throttle body via the first device.

12. A method of mounting a motor to a throttle body in the throttle control device as in claim 4, the method comprising the steps of:

a) attaching the support member to the other end portion of the rotor casing of the motor;

b) inserting the motor into the throttle body, starting with the other end portion with the support member attached thereto, to support the other axial end portion of the motor casing on the throttle body via the second support device resiliently with respect to a radial direction of the motor; and c) fixing the other end portion of the motor casing to the throttle body via the first support device.

13. A method of mounting a motor to a throttle body in the throttle control in claim 5, the method comprising the steps of:

a) attaching the support member to the other end portion of the motor casing of the motor;

b) inserting the motor into the throttle body, starting with the other end portion with the support member attached thereto, to support the other axial end portion of the motor casing on the throttle body via the second support device resiliently with respect to a redial direction of the motor; and c) fixing the other end portion of the motor casing to the throttle body via the first support device.

14. A method of mounting a motor to a throttle body in the throttle control device as in claim 6, the method comprising the steps of:

a) attaching the support member to the other end portion of the motor casing of the motor;
b) inserting the motor into the throttle body, starting with the other end portion with the support member attached thereto, to support the other axial end portion of the motor casing on the throttle body via the second support device resiliently with respect to a radial direction of the motor; and
c) fixing the other end portion of the motor casing to the throttle body via the first support device.

15. A method of mounting a motor to a throttle body in the throttle control device as in claim 7, the method comprising the steps of:
a) attaching the supporting member to the other end portion of the motor casing of the motor;
b) inserting the motor into the throttle body, starting with the other end portion with the support member attached thereto, to support the other axial end portion of the motor casing on the throttle body via the second support device with respect to a radial direction of the motor; and
c) fixing the other end portion of the motor casing to the throttle body via the first support device.

16. A method of mounting a motor to a throttle body in the throttle control device as in claim 8, the method comprising the steps of:
a) attaching the support member to the other end portion of the motor casing of the motor;
b) inserting the motor into the throttle body, starting with the other end portion with the support member attached thereto, to support the other axial end portion of the motor casing on the throttle body via the second support device resiliently with respect to a radial direction of the motor; and
c) fixing the other end portion of the motor casing to the throttle body via the first support device.

* * * * *